United States Patent [19]

Bishop et al.

[11] Patent Number: 5,499,158

[45] Date of Patent: Mar. 12, 1996

[54] PRESSURE TRANSDUCER APPARATUS WITH MONOLITHIC BODY OF CERAMIC MATERIAL

[75] Inventors: Robert P. Bishop, Pembroke; Paul L. Hainey, Douglas; Stanley J. Lukasiewicz, North Attleboro, all of Mass.; Allan J. Siuzdak, Cumberland; Robert E. Luminello, Jr., Johnston, both of R.I.; Vishwa N. Shukla, North Attleboro, Mass.

[73] Assignee: Texas Instruments Incorporated, Dallas, Tex.

[21] Appl. No.: 339,038

[22] Filed: Nov. 14, 1994

[51] Int. Cl.⁶ ........................................................ H01G 7/00
[52] U.S. Cl. ........................................ 361/283.4; 73/718
[58] Field of Search ........................... 361/283.1, 283.3, 361/283.4; 73/718, 724

[56] References Cited

U.S. PATENT DOCUMENTS

| | | |
|---|---|---|
| 4,425,799 | 1/1984 | Park . |
| 4,680,971 | 6/1987 | Kavli et al. . |
| 4,689,999 | 9/1987 | Shkedi ........................................ 73/718 |
| 4,716,492 | 12/1987 | Charboneau et al. . |
| 5,044,202 | 9/1991 | Southworth et al. . |
| 5,189,916 | 3/1993 | Mizumoto et al. . |
| 5,214,961 | 6/1993 | Kojima et al. . |
| 5,275,054 | 1/1994 | Park . |
| 5,349,865 | 9/1994 | Kavli et al. . |
| 5,436,795 | 7/1995 | Bishop et al. ........................ 361/283.4 |

Primary Examiner—Bot L. Ledynh
Attorney, Agent, or Firm—Russell E. Baumann; Richard L. Donaldson; Rene' E. Grosssman

[57] ABSTRACT

A monolithic capacitive pressure transducer (12) is shown composed of ceramic material having a first closed cavity (12) separated from a surface thereof by a flexible wall member and a second closed cavity (16) defined by rigid wall members. Capacitor plates (32, 36; 40, 44) are formed on two opposed surfaces defining each cavity. Vias (33, 37; 41, 45) are formed extending from the capacitor plates to permit electrical connection therewith. The transducer is made by separately forming under pressure a diaphragm (20) and first and second base portions (22, 30) having recesses (24) in the top and bottom surfaces using ceramic powder coated with an organic binder. A metal layer is deposited on the pieces which are then joined together to form a single unit. A spacer (26) may be inserted in the recesses to ensure that a predetermined gap is maintained in each cavity during the joining operation. The parts are then debinderized by heating to a first temperature level to allow the binder organics, as well as the spacer organics if a spacer is employed, to be vaporized and/or decomposed and removed through the open pores of the diaphragm and base. The unit is then brought up to a sintering temperature to change it into a monolithic body and to convert the metallized layer into a conductive layer bonded to the ceramic.

12 Claims, 3 Drawing Sheets

PRESSURE TRANSDUCER APPARATUS WITH MONOLITHIC BODY OF CERAMIC MATERIAL

BACKGROUND OF THE INVENTION

The invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive transducer is shown in the patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied pressure. The diaphragm is movable in response to variations in pressure applied to the diaphragm to vary the capacitance of the capacitor and the electrical circuit provides an electrical output signal corresponding to the applied pressure.

In order to maximize the economies of mass production to lower the transducer cost and thereby make such transducers economically feasible for a wide number of applications, including many previously served by low cost mechanical transducers, a standard size package is selected small enough to be received in a large number of applications yet large enough to provide a reliable signal. The size of the package determines the maximum size of the capacitor plates which, along with the gap between the plates, determines the capacitance signal. This results in limiting the size of the capacitor plates to a smaller size than would be ideal for many applications and relying on the electrical circuit to properly condition the signal. The circuit, on the other hand, requires a minimum level of capacitance for it to be able to effectively condition the output signal and this in turn affects the distance or gap required between the capacitor plates to produce the minimum capacitance level. In transducers of the type disclosed in U.S. Pat. No. 4,716,492 distances between the plates are in the order of 10–17 microns.

One approach described in the above patent to provide this selected gap employs a cup-shaped member having a relatively rigid rim secured to a base substrate placing a bottom of the cup in selected, spaced, overlying relation to a capacitor plate on the base substrate. An electrically conductive layer is disposed on the inner surface of the cup bottom to provide the second capacitor plate with the bottom being resiliently flexible to serve as a diaphragm to move the second plate toward and away from the first capacitor plate in response to variations in fluid pressure applied to the outer surface of the bottom of the cup. The configuration of the cup-shaped member, however, is not conducive to low cost manufacturing techniques. Due, in part, to the small sizes involved it is very difficult to obtain consistent flat surfaces on the cup bottoms which are parallel to the substrate surface. Slight variations from device to device cause changes in capacitance signals produced by the transducers which frequently fall outside the window of values acceptable by the signal conditioning circuitry.

Another approach described in the above patent employs a flat diaphragm element secured to the base substrate in selectively spaced relation thereto by disposing a spacing and securing medium such as a mixture of glass frit including a plurality of balls of glass of selected diameter between the flat diaphragm and the substrate at the periphery of the diaphragm. The glass frit is selected to be fusible at a first temperature at which the balls remain unfused and the mixture is then heated to the fusing temperature of the frit to secure the diaphragm to the substrate at a spacing from the substrate determined by the diameter of the balls. The provision of flat surfaces which extend over the entire diaphragm as well as the base substrate is very conducive to consistent, reproducible results from device to device; however, the flat surfaces generally require grinding to ensure that the surfaces are parallel to one another. Further, the use of the glass material to both space and secure the diaphragm to the base results in undesirable yield losses due to various factors such as unevenness sometimes occurring due to imperfections in the grinding process, variations in the compressive force used to clamp the diaphragms to the base when the device is fired to fuse the glass and other process variables such as the specific temperature profile of the firing and the specific glass composition employed.

In U.S. Pat. No. 5,044,202, assigned to the assignee of the instant invention, a curved recess is formed in the base over which a flat, flexible diaphragm is disposed. The spacing between capacitor plates deposited on the diaphragm and a central portion of the recess is determined by the curvature of the recess. Sealant material such as glass is disposed on the outer marginal portion of the curved surface of the recess. While this structure provides a reliable, accurate sensor it requires an extra grinding operation to form the recess which adds to the expense of the device.

In copending U.S. patent application Ser. No. 07/972,680, assigned to the assignee of the instant invention, a pressure responsive, variable parallel plate capacitive transducer is shown and described comprising a body of ceramic material having a cavity formed therein closely adjacent an outer surface thereof. Metal capacitor plates are deposited on opposite sides of two surfaces defining the cavity with vias extending to terminal areas. The ceramic comprises conventional material such as 80% by weight alumina up to essentially 100% with the balance being additives to form a glass at a sintering temperature. The ceramic is provided in powdered form coated with an organic binder, as a spray dried powder, ready for pressing into any selected configuration. First and second portions, i.e., a diaphragm and a base having a recess formed in an outer face surface, are formed by pressing the powder in a die. In one embodiment, metallized coatings of high temperature material such as tungsten in the form of a thick film paste, are deposited as by screen printing on one surface of the diaphragm portion and on the recessed outer face surface of the base portion. The vehicle used in the thick paste is then removed, as by heating. Spacer means of organic material may be placed in the recess to ensure that the cavity gap is maintained during the following pressing step. The two portions are then pressed together to form a single unit and then the unit is heated in an air atmosphere to a first debinderizing temperature. After the organics, including the spacer means, are vaporized/decomposed and released through the still open cells of the ceramic, the unit is placed in a high temperature oven and co-fired in a reducing atmosphere with the metal layers forming a conductive coating bonded to the ceramic and the ceramic being sintered together to form a monolithic, closed cell body.

According to a modified embodiment, low temperature ceramic materials can be used for the ceramic which can be sintered at a temperature low enough to permit the use of conventional printed circuit inks fired in an air atmosphere.

Such monolithic transducers offer many advantages regarding cost, reliability and improved yield in manufacturing. When used with a signal conditioning circuit of the type referenced above with regard to U.S. Pat. No. 4,716, 492, a reference capacitor is also employed as well as means for providing temperature compensation in order to achieve desired accuracy over a selected temperature range.

SUMMARY OF THE INVENTION

It is an object of the present invention to provide a reference capacitor for use with monolithic, variable plate capacitive transducers which does not require such temperature compensation.

Briefly, in accordance with the invention, a body of ceramic material is formed having at least two cavities formed therein with at least one cavity disposed closely adjacent an outer surface thereof. Metal capacitor plates are deposited on opposite sides of two surfaces defining each cavity with vias extending to terminal areas. The ceramic comprises conventional material such as alumina with additives forming a glass at a sintering temperature. The ceramic is provided in powdered form coated with an organic binder, as a spray dried powder, ready for pressing into any selected configuration. A first base portion having a selected outer periphery is formed by pressing powder in a die and in one embodiment with a recess in each of two opposed face surfaces. A second, relatively thin diaphragm portion and a third relatively thick portion having the same outer peripheries are formed and metallized coatings are deposited on each recessed outer surface of the base portion and on one surface of the second and third portions. Spacer means of organic material may optionally be placed in each recess to ensure that the cavity gaps are maintained. The second and third portions are then placed on and attached to the respective face surfaces to form a single unit and then the unit is heated to a debinderizing temperature at which the organics, including any spacer means, are vaporized/decomposed and released through the still open cells of the ceramic. The unit is then co-fired to sinter the ceramic material into a monolithic body with the metallized layers forming conductive coatings bonded to the ceramic and forming a pressure transducer having a variable parallel plate capacitor as well as a separate reference capacitor. In another embodiment, multiple recesses are formed in one or more of the pressed portions on the same face surface of a body portion or on opposed face surfaces. A thin diaphragm portion is then disposed over each face surface having a recess to form a pressure transducer having independently functioning capacitors.

BRIEF DESCRIPTION OF THE DRAWINGS

Other objects, advantages and details of the novel and improved capacitive pressure transducer of the invention and method of making appear in the following detailed description of preferred embodiments of the invention, the detail description referring to the drawings in which.

Figure 3:
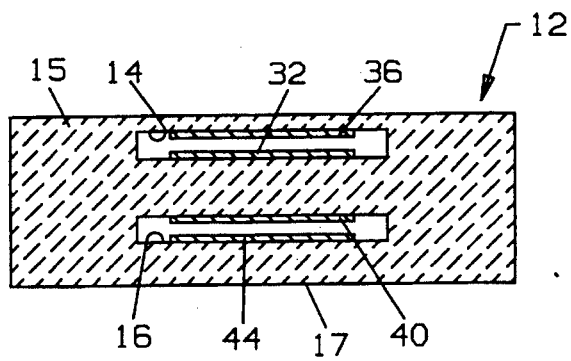
FIG. 3 is a cross section taken through a unit after it has been sintered.
Figure 4:
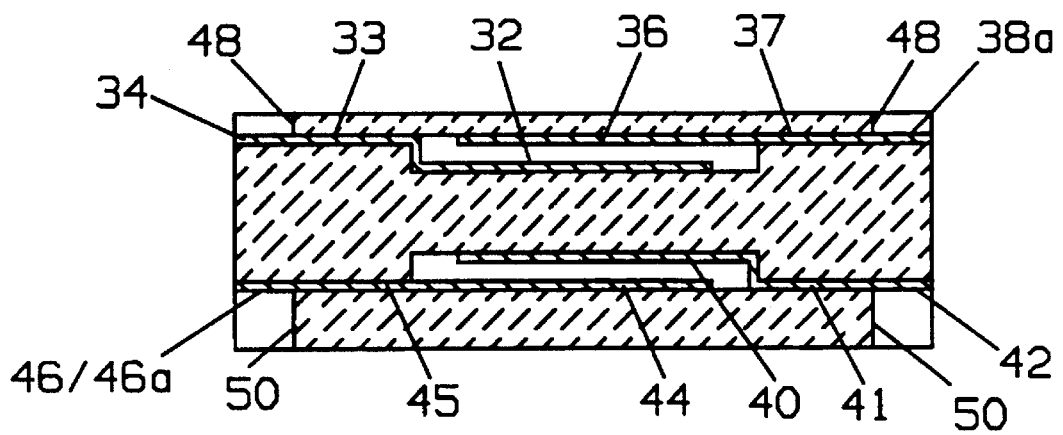
FIG. 4 is a cross section taken through the FIG. 3 unit in a direction chosen to include the vias extending from the capacitor plates.

With particular reference to FIGS. 3 and 4 of the drawings, a pressure responsive, variable capacitive transducer made in accordance with the invention comprises a monolithic body of ceramic material having a first cavity formed therein closely adjacent an outer surface of the body and a second cavity formed within the body but removed from any outer surface thereof. Capacitor plates formed of suitable material such as metal, as will be described below, are disposed on opposed surfaces of each cavity with vias extending from each plate to respective terminal pads for connection to externally disposed signal conditioning electrical circuitry (not shown).

Various ceramic materials can be utilized such as cordierite, mullite, etc. For example, a suitable composition comprises between approximately 80% by weight up to essentially 100% alumina with the balance being additives which form a glass at the sintering temperature of the alumina. Such material is conventional in the electronic substrate industry and can be either purchased as a spray dried powder ready to press or can be specifically formulated and spray dried according to known techniques to produce a free-flowing, granulated powder ready for pressing. The spray dried powder contains the alumina and an organic binder such as polyvinyl alcohol or other plastic to serve as a temporary adhesive holding the powder together after pressing until the resultant pressed material is sintered.

Figure 1:
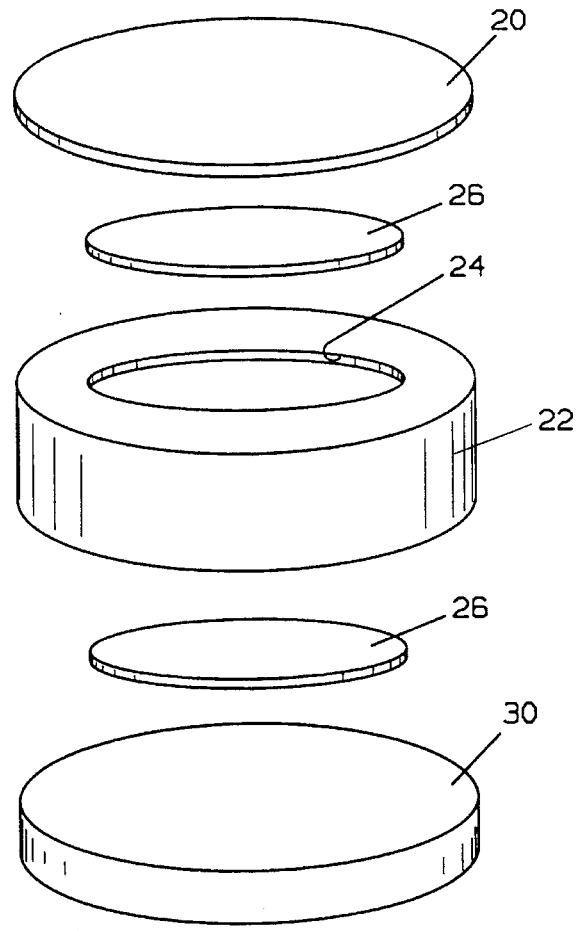
FIG. 1 a blown apart perspective view of a diaphragm, first and second portions and spacer means prior to being formed in a unitary body.

The alumina spray dried powder is pressed into the shapes of a generally cylindrical diaphragm and first and second base portions as shown in FIG. 1 at 20, 22 and 30 respectively, using a pressure in the range of approximately 1,000–30,000 psi. A recess or depression 24 of a selected depth of between 0.001 to 0.010 inches is formed in each end face of first base portion 22 at the time it is formed (the bottom recess not shown). The depth of the recess is selected to allow for the shrinkage of the materials, including the capacitor plates, to provide spacing between the electrodes from approximately 0.5 to 2.5 mils in the finished transducer.

Figure 2A:
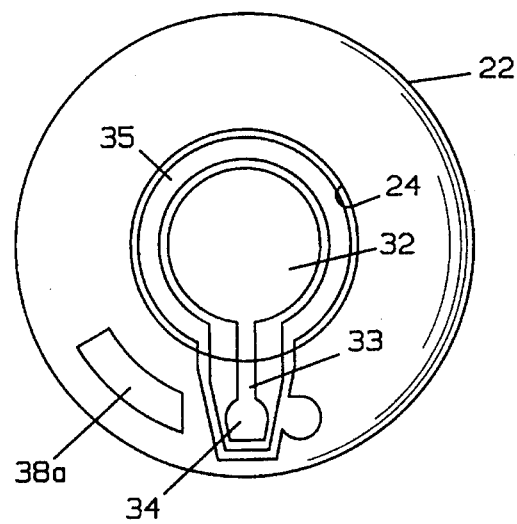
FIG. 2a is a top plan view of the first base portion with a metallized layer deposited thereon.
Figure 2B:
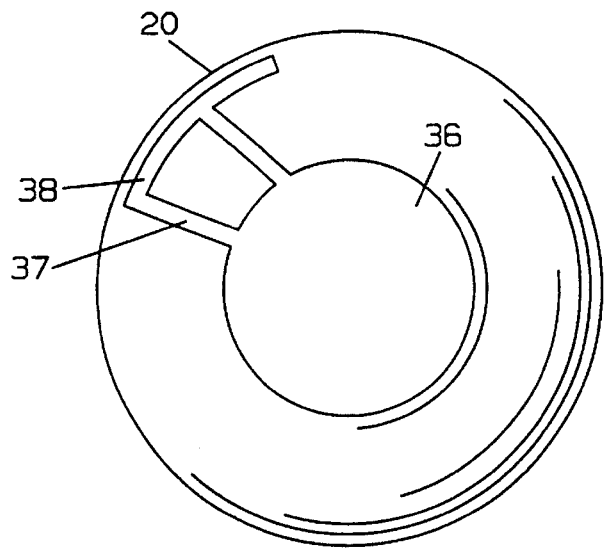
FIG. 2b is a bottom plan view of the diaphragm with a metallized layer deposited thereon.

After the initial pressing, the diaphragm 20 and base portions 22, 30 are strong enough to permit handling. A selected electrode pattern is applied to the bottom surface of diaphragm 20, the upper and lower surfaces of base portion 22 and the upper surface of base portion 30 by any suitable means, such as screen printing. A typical pattern is shown in FIGS. 2a, 2b. In FIG. 2a, for the upper surface of body portion 22, the pattern includes a capacitor plate 32, via 33, terminal pads 34, 38a and guard ring 35. In FIG. 2b, for diaphragm 20 the pattern includes capacitor plate 36, vias 37 and terminal pad 38. Terminal pad 38 engages terminal pad 38a on base 22 to effectively form a continuation of via 37 to facilitate providing electrical connection therewith by means of suitable terminals to be discussed below. Similar patterns are applied to the bottom surface of base portion 22 including capacitor plate 40, via 41 and terminal pads 42 and 46a and upper surface of base portion 30 including capacitor plate 44, via 45 and terminal pad 46 (FIGS. 3 and 4). Any suitable high temperature metal can be used such as tungsten, molybdenum, platinum or other high temperature material such as a conductive ceramic. For screen printing the metallization is applied in the form of conventional thick film paste which typically contains certain solvents to adjust viscosity for screen printing. After application the solvents can be removed slowly at room temperature or more rapidly by placing the parts into an air oven at approximately 100° C.

Preferably, fugitive spacers are used to help maintain the separation between respective electrodes of a pair and prevent the electrodes from engaging one another during the next step of pressing the diaphragm to the base. Fugitive spacer elements 26 composed of essentially non-compressible, consumable or decomposable material and having a thickness preferably essentially equal to the desired spacing between the electrodes or a plurality of sheets of such material the total thickness of which preferably essentially equals the desired spacing is placed in recesses 24. The spacer material is selected so that it is clean burning, i.e., so that there is no ash remaining after the spacer has been thermally removed after pressing the base and diaphragm together. Propylene carbonate and Delrin, a trademark of E.I. du Pont de Nemours Company for acetal, thermoplastic resin, are two such materials, and can be used in various thicknesses depending upon the desired gap. Multiple spacers can also be employed to accommodate any selected gap dimension.

Diaphragm 20 and base portions 22, 30 are then placed into a die or suitable isostatic press and pressed together using a pressure in a range between approximately 1,000 and 30,000 psi. If preferred, the parts can be attached to one another using low force by raising the temperature of the material to soften the organic binder, especially at the interface between the parts.

The several components, now pressed together to form a single body or unit, are placed in an oven and heated in an air atmosphere at relatively low temperatures, e.g., 300° C. in order to evaporate and burn out the binders and spacer material and allow the evaporated matter and combustion gasses to pass through the pores of the body before the body is sintered and the pores closed. The temperature is limited by the maximum temperature at which the metallization can be heated in an air or oxygen atmosphere without significant oxidation.

After removing as much as possible of the organic binder and the spacer material during the debinderizing operation, the assembled unit is placed into a high temperature furnace and sintered in the range of approximately 1400°–1700° C. in a reducing atmosphere. Typically the atmosphere contains approximately 1–100% hydrogen or dissociated ammonia with the balance usually nitrogen.

With appropriate binders in the spray dried powder and with an appropriate polymer for the spacing means if one is used, it Will be appreciated that the debinderization step could be accomplished as part of the firing cycle.

Sintering the alumina converts the unit into a monolithic device as shown at 12 in FIG. 3 and converts the metallization to electrically conductive layers bonded to the alumina. Unit 12 has a first cavity or gap 14 closely adjacent the top surface 15 and a second cavity or gap 16 removed from the bottom surface 17. The wall above gap 14 formed by diaphragm portion 20 is flexible and will flex in dependence upon fluid pressure applied to surface 15 forming a pressure transducer whereas the wall below gap 16 formed by second base portion 30 is rigid and essentially non-flexible to a reference capacitor having inherent temperature compensation since both capacitors will be at virtually identical temperatures at any given time.

After the unit has been fired, electrical connection means are added as by attaching pins to the metallized vias with conductive epoxy (not shown). Any suitable notches or the like to provide access to the vias can be provided during the original pressing step. As seen in FIG. 4, the diaphragm 20 and second body portion 30 may be notched at 48, 50 respectively to provide access to the terminal pads. The via 37 extending from the diaphragm portion 20 can be bridged over to terminal pad 38a on base portion 22 and a similar terminal pad 46a can be provided on base portion 30.

Figure 3A:
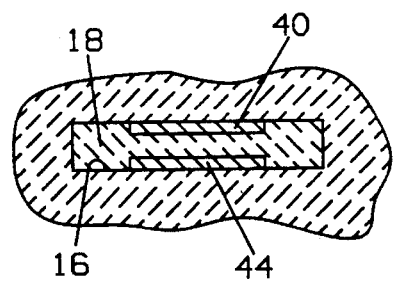
FIG. 3a is a broken away cross section of a modified FIG. 3 unit.

Although the reference capacitor has been described as having a gap 16 with air or other dielectric gas between the capacitor plates, it is within the purview of the invention, as seen in FIG. 3a, to employ a solid dielectric material 18 between plates 40 and 44. For example, a layer of ceramic material such as barium titanate ($BaTiO_3$) or other material compatible with the ceramic material forming the rest of the monolithic structure can be used as the dielectric material. Use of ceramic as the dielectric simplifies the requirement of having a precisely controlled fixed gap in the reference capacitor and eliminates the potential of a short across the plates of the reference capacitor.

Figure 5:
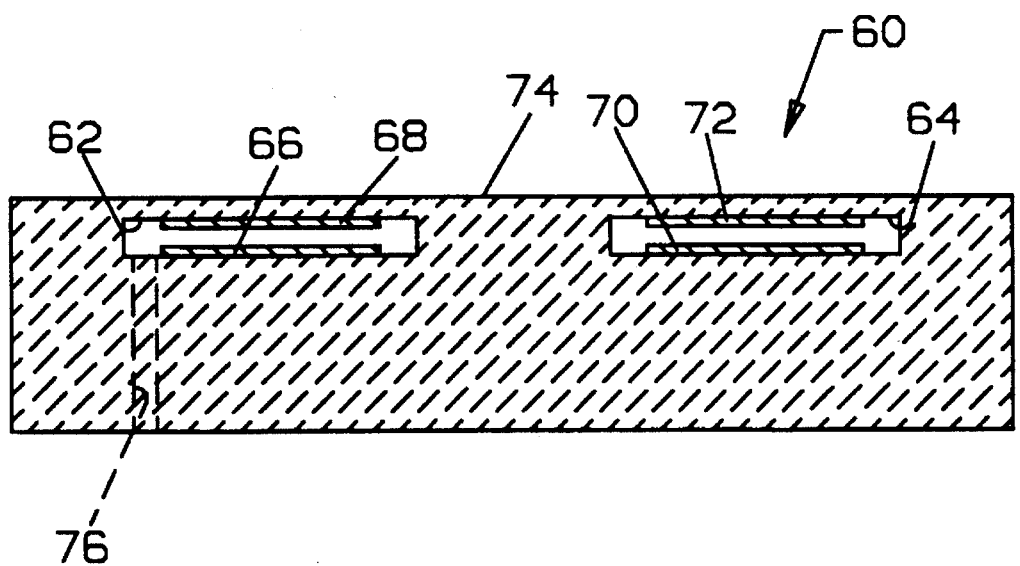
FIG. 5 is a cross section, similar to FIG. 3, of another embodiment of a transducer made in accordance with the invention.

With reference to FIG. 5, another embodiment of a monolithic, pressure responsive capacitive transducer 60 is shown in which first and second cavities 62, 64 are formed in the same manner as described above with relation to unit 12 except that two recesses are formed in the top end surface of body portion 22 and a diaphragm portion is placed over both recesses. Appropriate conductive patterns are applied in the same manner as in unit 12 so that capacitor plates 66, 68 are disposed on opposite sides of gap 62 and capacitor plates 70, 72 are disposed on opposite sides of gap 64. Suitable vias and terminal pads (not shown) are provided in the same manner as described above with relation to unit 12. Transducer 60 can be used to sense two different pressures by using suitable port fittings and sealing gaskets on surface 74 so that the flexible diaphragm portion above gap 62 will be exposed to one pressure while the flexible diaphragm portion above gap 64 will be exposed to a second pressure. Although two recesses are shown, it will be understood that, if desired, additional recesses can be formed to provide additional capacitive sensors in the same body.

It will be understood that monolithic capacitive transducers of the type described above can be made into gauge devices by providing a vent bore into the capacitor gap as shown at 76 in FIG. 5 by an appropriate tooling pin or the like placed in the base portion when forming the parts and when pressing them together. Vent 76 can be opened to atmosphere or, if a differential sensor is desired, it can be coupled to a secondary pressure source with the primary pressure source applied to the flexible diaphragm portion above gap 62 on surface 74. A vacuum device can be provided by evacuating the gap through the vent bore after sintering has been completed and then plugging the vent bore.

It is also within the purview of the invention to employ low temperature ceramics such as alumina, silica or other conventional materials and a glass binder used in making electronic substrates, which can be sintered at temperatures such as approximately 700°–1000° C. in air along with standard thick film inks for metallization, such as silver, palladium, gold, nickel, copper and the like. The glass composition is chosen so that densification is complete at that temperature. A significant advantage of using low temperature ceramics is that it avoids having to use a controlled atmosphere during the co-firing process.

It should be understood that though preferred embodiments of the invention have been described by way of illustrating the invention, this invention includes all modifications and equivalents of the disclosed embodiments falling within the scope of the appended claims.

We claim:

1. A capacitive pressure transducer comprising a monolithic body of ceramic material having an outer periphery and having a top and a bottom surface and having a first closed cavity in the body adjacent to and separated from the top surface by a flexible wall member, and a second closed cavity adjacent to and separated from the bottom surface by a rigid wall member, the cavities each having a bottom wall, a respective electrically conductive layer disposed on the flexible and the rigid wall members and the bottom walls, the conductive layers in each cavity separated from one another by a gap and electrically conductive via means extending from the conductive layers out to an external portion of the body for making electrical connection therewith.

2. A capacitive pressure transducer according to claim 1 in which the ceramic material comprises alumina.

3. A capacitive pressure transducer according to claim 2 in which the composition of alumina is at least 80% by weight.

4. A capacitive pressure transducer according to claim 2 in which the electrically conductive layers are selected from the group consisting molybdenum, tungsten, platinum and conductive ceramics.

5. A capacitive pressure transducer according to claim 1 in which the distance between the conductive layers of the gap in each cavity is between approximately 0.5 to 2.5 mils.

6. A capacitive pressure transducer comprising a monolithic body of ceramic material having an outer periphery and top and bottom surfaces and having a plurality of closed cavities formed by spaced upper and lower surfaces in the body, first and second electrically conductive layers disposed on the spaced upper and lower surfaces and electrically conductive via means extending from the conductive layers out to an external portion of the body for making electrical connection therewith, at least one of the cavities spaced from the top surface by a flexible wall member.

7. A capacitive pressure transducer according to claim 6 in which at least two cavities are spaced from the top surface by a respective flexible wall member.

8. A capacitive pressure transducer according to claim 6 in which the spaced upper and lower surfaces of at least one cavity are formed on rigid wall members.

9. A capacitive pressure transducer according to claim 6 in which the ceramic material comprises alumina.

10. A capacitive pressure transducer comprising a monolithic body of ceramic material having an outer periphery and top and bottom surfaces and having a closed cavity in the body adjacent to and separated from the top surface by a flexible wall member, the cavity having a bottom wall, first and second electrically conductive layers disposed in the cavity on the flexible wall member and the bottom wall, to form a pressure responsive variable capacitor, third and fourth electrically conductive layers formed within the body and being spaced from one another by dielectric material to form a reference capacitor, and electrically conductive via means extending from the conductive layers out to an external portion of the body for making electrical connection therewith.

11. A capacitive pressure transducer according to claim 10 in which the dielectric material is ceramic.

12. A capacitive pressure transducer according to claim 1 in which the ceramic material is a low temperature ceramic and the electrically conductive layers are selected from the group consisting of nickel, silver, palladium, gold and copper.

* * * * *